(12) United States Patent
Morse (10) Patent No.: US 9,492,027 B2
(45) Date of Patent: *Nov. 15, 2016

(54) INFUSION PROCESS APPARATUS AND METHOD

(71) Applicant: Made Simpli, LLC, Hermosa Beach, CA (US)

(72) Inventor: Jennifer Morse, Hermosa Beach, CA (US)

(73) Assignee: Made Simpli, LLC, Hermosa Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,942

(22) Filed: Jan. 9, 2016

(65) Prior Publication Data

US 2016/0166103 A1    Jun. 16, 2016

Related U.S. Application Data

(63) Continuation-in-part of application No. 14/593,643, filed on Jan. 9, 2015.

(60) Provisional application No. 61/964,621, filed on Jan. 10, 2014.

(51) Int. Cl.
*A47J 31/20* (2006.01)

(52) U.S. Cl.
CPC ...................... *A47J 31/20* (2013.01)

(58) Field of Classification Search
CPC ........... A47J 31/18; A47J 31/20; A47J 31/38
USPC ................................... 99/279, 316–319, 297
See application file for complete search history.

(56) References Cited

U.S. PATENT DOCUMENTS

| 482,299 A | * | 9/1892 | Comstock | ............... A47J 31/20 222/482 |
| 512,675 A | * | 1/1894 | Appleberg | ............... A47J 31/02 99/299 |

(Continued)

FOREIGN PATENT DOCUMENTS

| CH | 243568 A | * | 7/1946 | ............. A47J 31/20 |
| DE | 19548130 A1 | * | 2/1997 | ............. A47J 31/20 |

(Continued)

*Primary Examiner* — David Angwin
*Assistant Examiner* — John J Norton
(74) *Attorney, Agent, or Firm* — Larry J. Guffey, Esq.; Pamela K. Riewerts, Esq.; Oliver & Grimsley, LLC (57) ABSTRACT

An infusion process apparatus for making a beverage includes a container, an insert which initially holds a measured amount of an infusible material and later holds this same material in the form of the grinds that are filtered from the beverage, an elongated plunger, a filtering basket attached to the plunger, and a means adapted to releaseably lock with the insert so as to remove it and its grinds contents from the container as the filtering basket is withdrawn from the container—thereby providing for easy cleanup of the process' grinds, and wherein the filter basket's bottom is adapted to compress the filtered infusible material that has been forced down into the insert by the filter basket's downward movement and to adhere to the insert's contents while stopping the infusion process so that the beverage does not acquire the characteristic bitterness and burnt taste that is associated with an over-infused brew.

20 Claims, 6 Drawing Sheets

(56) References Cited

U.S. PATENT DOCUMENTS

| | | | | |
|---|---|---|---|---|
| 882,183 | A * | 3/1908 | Wells | A47J 31/20 99/319 |
| 2,109,363 | A * | 2/1938 | Williams | A47J 31/20 99/284 |
| 2,562,433 | A * | 7/1951 | Moore | A47J 31/20 99/300 |
| 3,020,823 | A * | 2/1962 | Musso | A47J 31/20 426/433 |
| 5,618,570 | A * | 4/1997 | Banks et al. | A47J 31/20 426/435 |
| 5,887,510 | A * | 3/1999 | Porter | A47J 31/20 99/287 |
| 6,324,966 | B1 * | 12/2001 | Joergensen | A47J 31/20 99/287 |
| 7,992,486 | B2 | 8/2011 | Constantine et al. | |
| 9,179,798 | B2 | 11/2015 | Albanese | |
| 2006/0124628 | A1 * | 6/2006 | Long | A47J 31/20 219/438 |
| 2011/0056385 | A1 * | 3/2011 | McLean et al. | A47J 31/20 99/297 |
| 2012/0328750 | A1 * | 12/2012 | Giordano | A47J 31/20 426/433 |
| 2013/0233177 | A1 * | 9/2013 | Lambert | A47J 31/38 99/295 |
| 2014/0016429 | A1 | 1/2014 | Constantine et al. | |

FOREIGN PATENT DOCUMENTS

| | | | | |
|---|---|---|---|---|
| DK | WO 02067739 | A1 * | 9/2002 | A47J 31/20 |
| DK | WO 2012025125 | A2 * | 3/2012 | A47J 31/20 |
| DK | EP 2798985 | A1 * | 11/2014 | A47J 31/18 |

* cited by examiner

INFUSION PROCESS APPARATUS AND METHOD

CROSS-REFERENCE TO RELATED APPLICATIONS

This a Continuation-In-Part Patent Application and claims the benefit of U.S. patent application Ser. No. 14/593,643, filed Jan. 9, 2015 and entitled "Infusion Extracting Apparatus and Method," and the entire specification of the aforementioned application is hereby incorporated herein in its entirety by reference to the extent that it does not conflict with the information herein.

BACKGROUND OF THE INVENTION

1. Field of the Invention

The present invention generally relates to equipment and methods for use in a beverage making process. More particularly, it relates to a method and an apparatus capable of being used for extracting an active and soluble portion of a substance or infusible material (such as ground coffee beans or tea leaves) by steeping that substance in a liquid, usually hot water, so as to create a new version of a desired beverage (also referred to as an extraction solution or extract or infusion or brew) that is often named after the substance that was steeped to create it (e.g., coffee from ground coffee beans and tea from ground tea leaves).

2. Description of the Related Art

Extraction or infusion devices, such as the French Press type coffee maker, have been in use for many years. Generally, they usually involve a method that includes placing an infusible material (such as ground coffee beans or tea leaves) in a container filled with hot water and, after allowing the mixture to steep for a sufficient time period, the infusible material which has been suspended in the container filled with the hot water is pushed downward into the container using a plunger with strainer to separate the infusible material from the extract. The infusible material, which, after the active and soluble portion of the infusible material has been extracted, is often referred to as "solid grounds," is trapped between the strainer and the bottom of the container, and the extract is poured out. Such devices and methods are not limited to use with coffee or tea. Some medical devices, for example, operate with a similar manner and technique.

Alternative extraction or infusion methods that involve placing a ground infusible material in contact with hot water entail using an AeroPress or an espresso maker. In the AeroPress, a filter is positioned over openings at the bottom of a cylindrical container or holder. The grounds infusible material or grounds and hot water are mixed together and allowed to steep over the filter for a period of time. Then, a plunger, which makes an airtight seal with the container is used to force the extracted with the suspended grounds through the filter 2220 into a receiving vessel. The grounds are held above the filter. The French press device and AeroPress device differ in that pressure is applied in the AeroPress to force the extract past the grounds as it exits the container.

To make an espresso drink, the grounds are first compacted together to form a "puck." Hot water is then forced under high pressure through the contained puck into a receiving vessel. A wide variety of devices have been devised to make espresso drinks.

In the process for preparing a new version of a desired beverage, i.e., extraction solution or extract or infusion or brew, the infusible material (which may come in the form of a bean) is often roasted and then ground. The fineness or coarseness of the grind of the roasted beans affects the flavor of the brew. The coarseness of the grind is typically matched to the method that will be used to make the coffee. Brewing methods in which the grounds are exposed to heated water for a relatively long period of time generally use a coarse grind. If the grind for such methods is too fine, then too much surface area of the beans will be exposed to water for too long a time, and the resulting brew will be over-extracted, producing a bitter taste. On the other hand, if the brewing method used exposes the ground beans to the heated water for a short period, too coarse a grind will result in a weak, tasteless brew.

Two major problem associated with prior art devices and methods is that they are often susceptible to making over-extracted, bitter brews and they do not allow for the easy cleanup of the infusible material or grounds once the extraction has taken place. For example, with a typical, prior art French Press type coffee maker, the user must remove the plunger and strainer and then wash the spent grounds out of the container. This can be a messy process, particularly if there is not a handy water source. And, it can be difficult to remove coffee grounds using water without have a significant portion wash down a drain or otherwise cause a mess in one's sink. If a user decides to leave the coffee grounds in the container, then the user must remove the extract immediately or otherwise the extract may become bitter.

What is needed is a French Press type apparatus that allows for the efficient and thorough separation of the infusible material or grounds from the extract, and also an easy cleanup of the grounds—maybe even the ability to remove the infusible material without having to remove the extract.

SUMMARY OF THE INVENTION

The present invention provides an infusion process apparatus and method that overcomes some of the shortcomings of French Press type extraction apparati known in the prior art.

In a preferred embodiment, the present invention is an apparatus for separating or filtering by multi-phase filtration means the beverage or extract yielded by an infusion process from any of the infusible material that was used in the process and is subsequently suspended during the steeping process in the extract while also providing for the easy removal and disposal of such filtered infusible material or grinds. This preferred embodiment includes: (a) a container having a bottom with a perimeter edge, a container wall that extends vertically upward from around the perimeter edge and terminates in a container rim that encloses and defines an opening into the container, and wherein the container is adapted to hold the liquid and infusible material during the infusion process, (b) an insert having an bottom with a perimeter edge, an insert side with an insert inner face that extends vertically upward from around the perimeter edge and terminates in an insert rim that encloses and defines an insert opening into the insert, and wherein this insert is adapted to enable it to be temporarily inserted through the container's opening and into the container so that the insert's bottom rests proximate the container's bottom during the infusion process and initially holds a measured amount of the infusible material that is to be used in the infusion process, (c) an elongated plunger having proximal and distal ends, (d) a container lid having a center orifice with a perimeter edge and a tubular wall extending downward from this center orifice perimeter edge and adapted to allow the distal end of the plunger to pass through the lid's center orifice so as to align the plunger's and container's longitudinal centerlines, (e) a filtering basket having a solid bottom with a bottom perimeter edge, a porous top with a top perimeter edge, a porous basket side that releaseably attaches to and extends vertically from either the basket's top or bottom perimeter edges and with the basket side having an upper portion that includes a basket rim, and wherein the filter basket has a configuration adapted to enable the basket top to attach to the plunger's distal end so as to enable the filtering basket to be temporarily situated in the container and moved vertically up and down within it by the movement of the plunger as the beverage in the container is filtered of grinds (or the infusible material that is suspended during the steeping process in the beverage) in two phases by forcing the beverage to flow through the basket's porous side (phase one) and top surfaces (phase two), (f) a filter seal attached to the filter basket's top edge and sealing it to the container wall as the filter basket moves down in the container so as to prevent the suspended infusible material from passing between the filter basket side and the container wall during the movement of the filter basket and rising above the filtering basket's top surface, and (g) a basket coupling means attached to the filtering basket and having a configuration adapted to enable the basket coupling means to temporarily and releaseably lock together with the insert when the bottom of the filtering basket moves downward though the insert's opening and into said insert to compact the infusible material and wherein this locking together is sufficient to enable the insert, with its contents of now compacted infusible materials, to be lifted upward and out of the container.

In a variation of this preferred embodiment of the present invention, the filter basket's bottom has a configuration adapted to compress the suspended infusible material that has been forced down into the insert by the filter basket's downward movement and to temporarily and releaseably promote adhesion to the filtered and compacted infusible material and to stop the infusion process so that, if the extract remains in the container, it does not acquire the characteristic bitterness and burnt taste that is associated with an over-infused extract caused by an excessive steeping period.

In another variation of this preferred embodiment of the present invention, it further includes a pliable insert basket having a configuration adapted to enable the cylindrical insert to be temporarily and removably inserted into the insert basket so that its rim assumes a position that is proximate the container wall so as to aid in safely positioning and locating the insert in the bottom of the container.

In another variation of this preferred embodiment of the present invention, it further includes a paper or micromesh or other specialized filter that is situated in the filtering basket or proximate its top surface, and wherein each of these specialized filters have a configuration adapted to provide the beverage with a third phase of filtration.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The present invention generally relates to equipment and methods for use in a beverage making process. More particularly, it relates to a method and an infusion process apparatus capable of being used for extracting an active and soluble portion of a substance or infusible material (such as ground coffee beans or tea leaves) by steeping that substance in a liquid, usually hot water, for a specified time or steeping period so as to create a new type of beverage (also referred to as an extraction solution or extract or infusion or brew) that is often named after the substance that was infused to create it (e.g., coffee from ground coffee beans and tea from ground tea leaves), while also providing for the easy removal and disposal of the separated infusible material.

Figure 1:
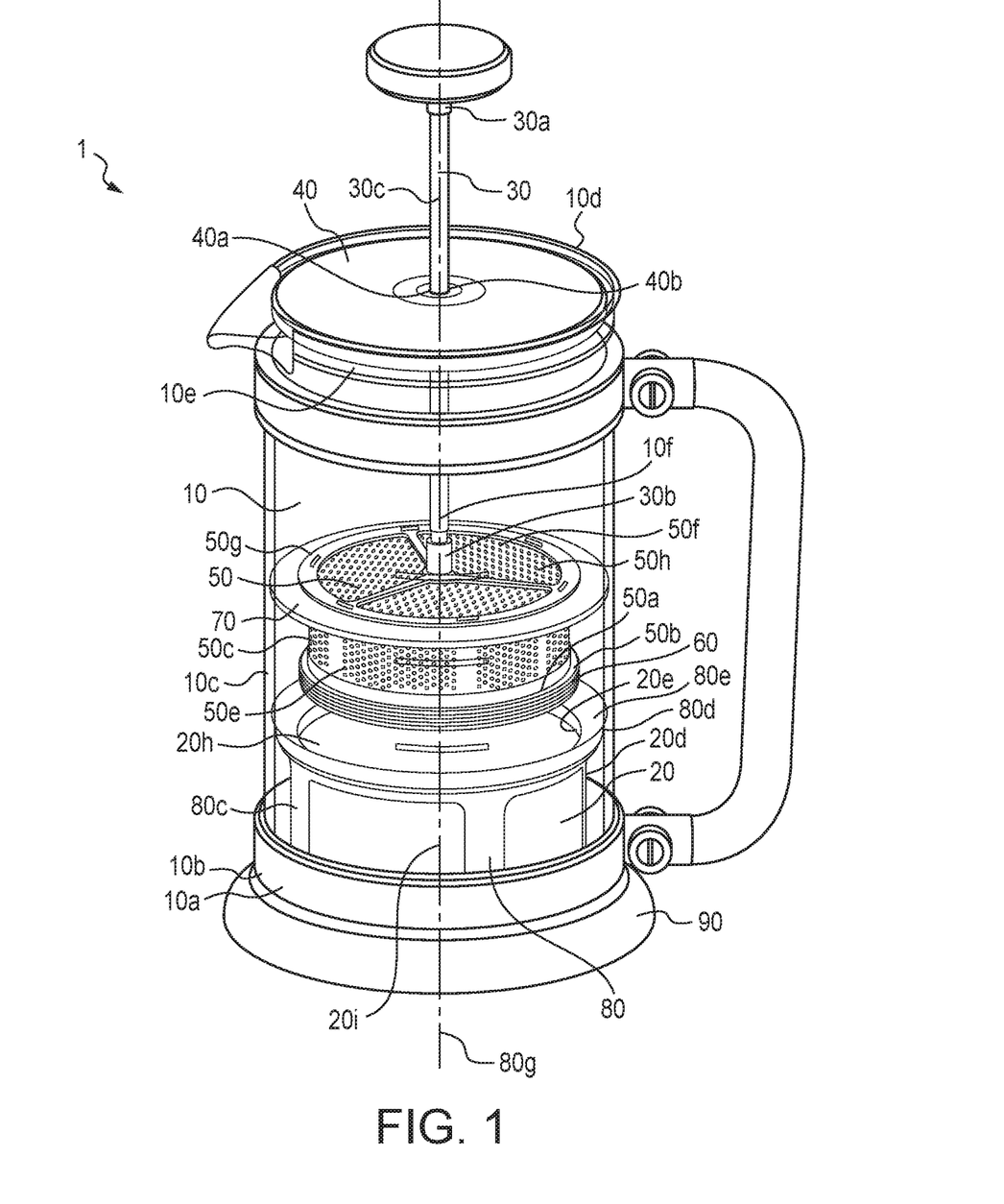
FIG. 1 is a perspective view of a preferred embodiment of the present invention when the filter basket has been moved down about half way towards the insert in the bottom of the container and before any infusible material or liquid have been added to the container.
Figure 2:
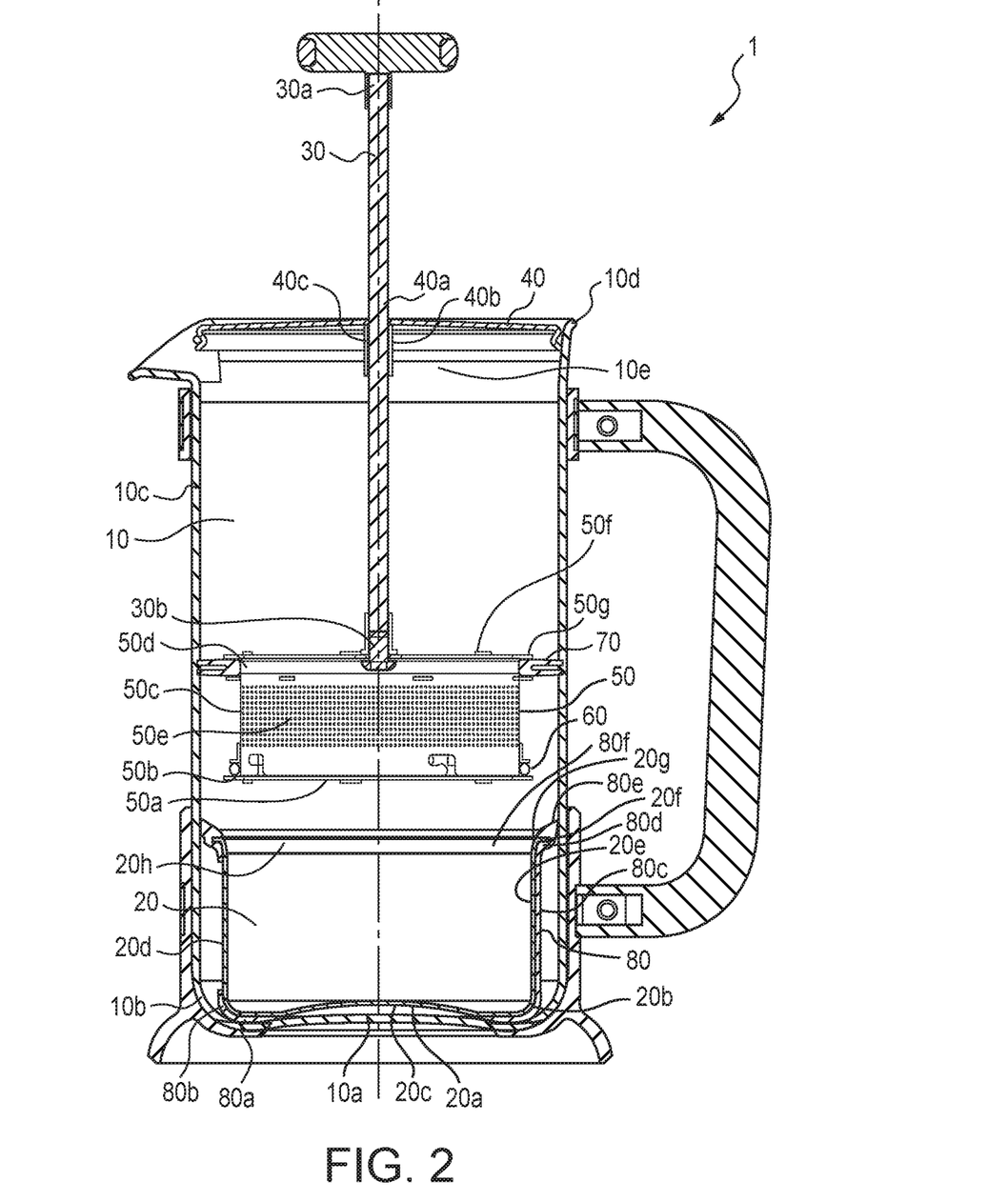
FIG. 2 is a cross-sectional view of the preferred embodiment of the present invention shown in FIG. 1.

FIGS. 1 and 2 provide, respectively, a perspective view and a cross-sectional view of a preferred embodiment of the present invention. It is seen to include a cylindrical container 10 or carafe having a container bottom 10a with a perimeter container bottom edge 10b, a container wall 10c that extends vertically upward from around the perimeter container bottom edge for a specified uniform distance that defines the wall's height and terminates in a container rim 10d that encloses and defines a container opening 10e into the top of container, and it can be referred to as having a container longitudinal centerline 10f that extends between the container's bottom and its opening. This container is generally configured to hold the liquid and infusible material during the infusion process that takes place within the container.

This container may be made of glass, metal, plastic, ceramic, or other materials typically used with coffee/tea making apparatuses. Additionally, the container may optionally include a double-layered wall, such as a double metal wall, with a vacuum or an insulating substance between such a container's two walls. As shown in FIG. 1, this container may also be provided with a base 90 in which the container sits and may be removed therefrom for cleaning and other purposes.

Figure 4A:
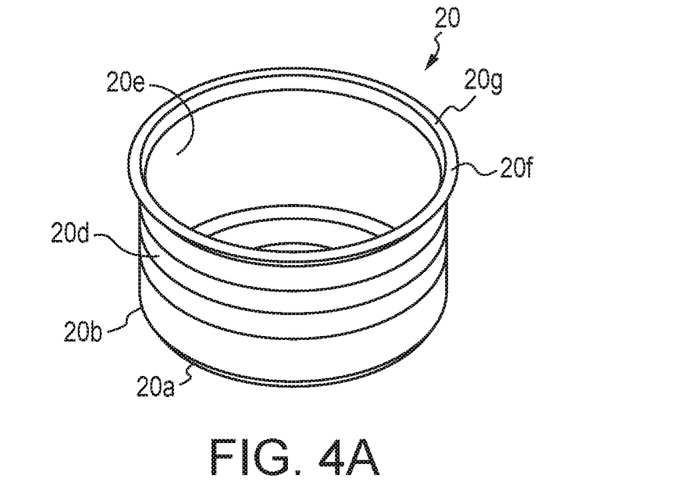
FIG. 4A is a perspective view of the cylindrical insert of the present invention shown in FIG. 1.

Inserted in the bottom of the container is a cylindrical insert 20 that has an insert bottom 20*a* with a perimeter insert bottom edge 20*b*, an insert side 20*d* with an insert inner face 20*e* that extends vertically upward from around this insert's bottom edge, for a specified uniform distance that defines the side's height, and terminates in an insert rim 20*f* that encloses and defines an insert opening 20*h* into the insert. An insert longitudinal centerline 20*i* can also be identified for this insert. This insert generally has a configuration adapted to enable it to be temporarily inserted through the container's opening so that the insert's bottom rests proximate the container's bottom during the infusion process and to enable the insert to initially contain a measured amount of the infusible material that is to be used in the infusion process. See FIGS. 4A-4B.

Figure 4B:
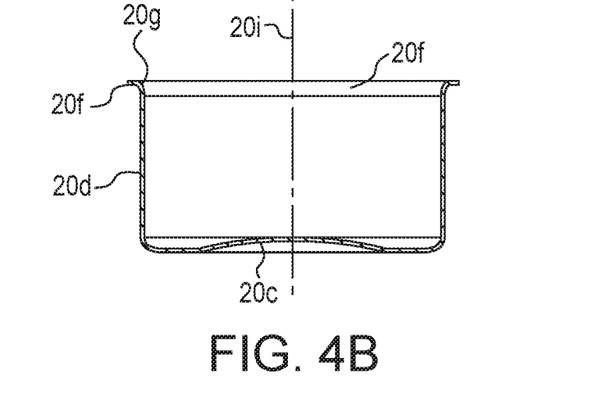
FIG. 4B is a cross-sectional view of the cylindrical insert shown in FIG. 4A.

Additionally, it can be noted in FIG. 4B that the insert's bottom has a concave portion 20*c* adapted to promote the movement of the insert off of the bottom of the container at the end of the infusion process when the container is filled with the newly created brew or extract and the infusible material has been filtered from the extract and compacted down into the bottom of the insert. The insert's rim 20*f* is also seen to have a top surface 20*g* that is configured to extended upward and outward from the insert's side so as to aid in directing the movement of the bottom of the filter basket 50*a*, seen in FIGS. 1-2, through the insert's opening and into the insert.

This insert 20 may be made of any strong, light and moldable material used in the manufacture of press type extract apparatus such as plastic, metal, and other such materials. Its side may also contain markings that can be used to measure the amount of infusible that is initially placed in the insert at the beginning of an infusion process.

The present invention has a unique filtering basket 50 with multi-phase filtering capability. See FIGS. 3A-3B. It has a basket bottom surface 50*a* with a perimeter basket bottom edge 50*b*, a porous basket top surface 50*f* with a perimeter basket top edge 50*g*, a porous basket side 50*c* that attaches to and extends vertically from either the top or bottom's perimeter edge. The basket's porous side and top surface provide, respectively, both a first and a second phase of filtering as the basket is moved downward during the filtering process and the beverage is forced to flow through these porous elements and their various smaller sizes holes serve to filter out and block any of the larger size grinds that were suspended in the beverage during the steeping process from flowing through the basket and contaminating the filtered beverage which results above the filtering basket.

Figure 3A:
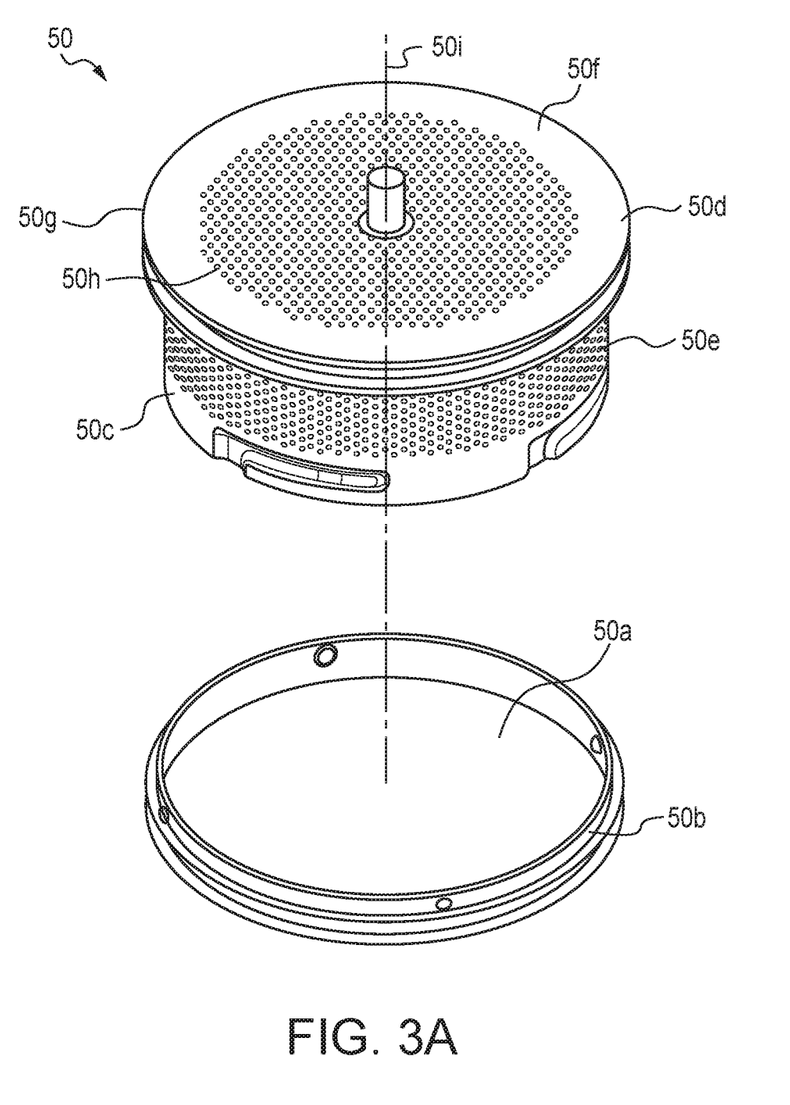
FIG. 3A is an exploded, perspective view of the filter basket of the present invention shown in FIG. 1.

The side's attachment may also be releasable (e.g., by using a threaded, bayonet or other type of connector) so as to allow either the top or bottom to be removed so that the interior of the basket may be used to house an optional, third type or phase of filtering (e.g., one or more stacked paper filters of the kind that are used for coffee making).

Such a third phase of filtering can also be achieved by using an additional and optional, specialized filter proximate or above the basket's top surface. See FIG. 3B where there is shown a cross-sectional view of the lower portion of a preferred embodiment of the present invention at a point in time when the filtering basket 50, with its porous side and top surfaces, has moved down into an empty (i.e., no coffee grounds have yet been added) insert 20 and wherein a three-phase, filtration mode of operation is being utilized that includes a micromesh or specialized filter 50*j* used proximate the basket's top filtration surface. This micromesh filter is one of a set of specialized, optional filters that can be used proximate the basket's top surface to provide additional filtering capability. The micromesh filter is special because of its very small diameter holes or pores, some of which can be so small as to preclude any particles greater than 150 microns from passing through such a micromesh filter.

Additional advantages of having a releasable top or bottom (i.e., other than allowing for the use of paper filters within the basket) include: (i) providing the ability for one to clean the inner portions of the filtering basket's outer surfaces, (ii) allowing the inside of the filtering basket to be used as a receptacle to hold tea leaves when the apparatus is used for making tea, and (iii) allowing the inside of the filtering basket to be used as a receptacle to hold special flavorings (e.g., spices, fruits) that are used in the recipe for a desired brew.

This paper filter option has the additional advantage of greatly reducing one's consumption of cafestol (a diterpene molecule present in small amounts [0.4-0.7% by weight] in coffee beans) whose regular consumption has been observed to result in one having increased levels of serum cholesterol. For consumers concerned about such possible health concerns, the paper filter option is valuable option of the present invention. This paper filter option also yields a "gritless" brew or coffee; thus, the option to use fine grinds (e.g., espresso) without them making it through the filter.

The filtering basket's side also has an upper portion that includes a basket rim 50*d*. The basket's top surface is attached to the distal end of the plunger and the basket is generally configured to enable it to be, temporarily and during the infusion process, situated in the container and moved vertically up and down by the plunger's movement to filter the suspended infusible material from the resulting extract or beverage.

Figure 3B:
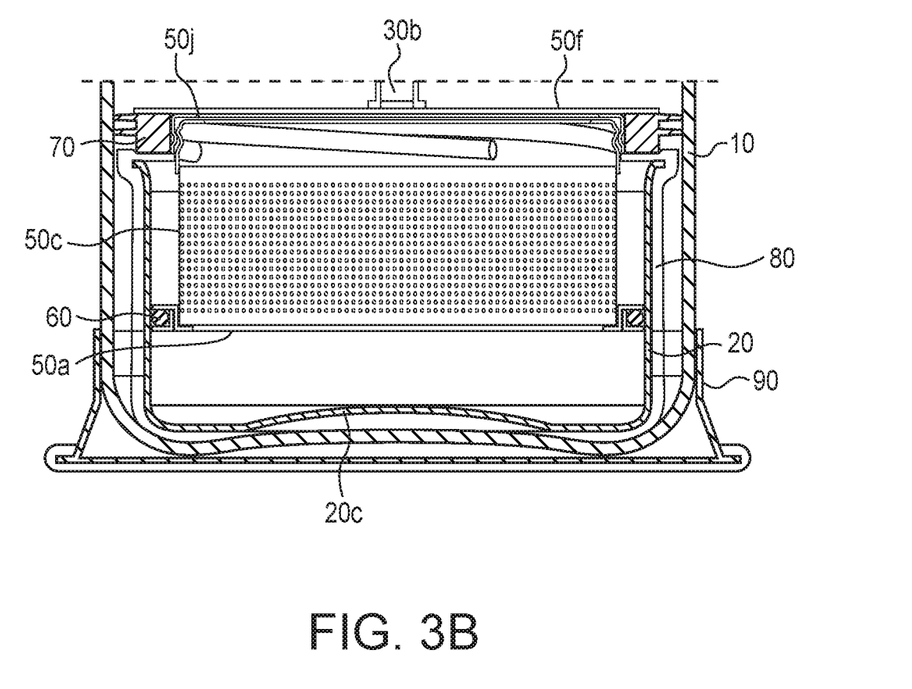
FIG. 3B is a cross-sectional view of the lower portion of a preferred embodiment of the present invention at a point in time when the filtering basket has moved down into an empty insert and wherein a triple filtration mode of operation is being utilized that includes an optional micromesh filter being used proximate the basket's top, second phase, filtration surface.

As mentioned above, the first two phases of the basket's filtering operation is achieved by the filter basket side and top surface having porous portions 50*e*, 50*h* through which the extract flows as the suspended infusible material is filtered from the beverage. Additionally, the filter perimeter basket's top edge 50*g* has an attached filter seal 70 that seals this perimeter edge to the container's wall so as to prevent the suspended infusible material from passing between it and the side of the filter basket side and then rising above the filtering basket's top surface during the basket's filtering movement down through the container as the filtered extract or beverage flows through the filtering basket's porous top and side surfaces—i.e., after this filtering process, only the filtered beverage resides above the filtering basket's top surface.

The porosity of the filter basket's side and top porous portion is sufficient to separate the extract yielded by the infusion process from any of the infusible material that is suspended in the extract as the bottom 50*a* of the filtering basket is moved downward through the container. This basket eventually come to rest when its bottom surface moves temporarily into the insert to compact the infusible material that has been filtered and forced down into the insert where it initially resided before the addition of water to the container.

These porous portions can be created in many ways. For example, a thin sheet (e.g., sheet thickness in the range of 0.01-0.03 inches) of material (e.g., stainless steel) with small diameter and close together holes (e.g., hole diameters in the range of 0.01-0.03 inches and spaced apart so as to yield porosities in the range of 25%-60%) in it may be used.

The filtering basket's bottom 50a is especially unique in that it is configured to, while compressing the previously suspended, infusible material that has been forced down into the insert, to temporarily and releaseably promote adhesion to this filtered and compacted infusible material and to also stop or bring a halt to the infusion process that had been occurring in the container. The advantage of this is that, if the extract were to remain in the container, it would not acquire the characteristic bitterness and burnt taste that is often associated with an over-infused extract that has undergone an excessive steeping period. Various ways to configure the filter basket's bottom surface are to fabricate it preferably as a solid surface that is either smooth or has short spike-shaped protrusions or other means extending vertically down from the bottom that are sized and configured so as to promote adhesion to the infusible material that has been compacted into the insert. In certain situations, a porous bottom surface has even been used.

This adhesion of the filtered and compacted infusible material to the filter basket's bottom surface 50a is important since the filtering or filter basket 50 is also configured to help remove the insert 20 and its contents from the container 10 so as to avoid the container cleanup task that is associated with a French Press type of infusion process that has no such insert.

A basket coupling means 60 (e.g., an O-ring located at or proximate the basket's perimeter bottom edge [in some situations, it may be mounted on the basket's side but near its bottom edge] has an outer portion that is temporarily compressed against the insert's inner face 20e as the basket's bottom moves downward into the insert) is attached to the filtering basket and is adapted to enable this basket coupling means to temporarily and releaseably lock together with the cylindrical insert 20 when the bottom 50a of the filtering basket moves downward though the insert opening and into the insert. This temporary locking together further aids in enabling the insert to then be lifted upward and eventually out of the container during the subsequent upward movement of the filtering basket when it is desired to remove the grinds from the container.

An elongated plunger 30 having a proximal 30a and a distal end 30b and a plunger longitudinal centerline 30c that extends between the ends and with a handle on its proximal end is used to move the filtering basket up and down in the container.

A cylindrical container lid 40 having a center orifice 40a with a perimeter edge 40b and a tubular wall 40c extending downward from center orifice perimeter edge is adapted to allow the plunger's distal end to pass through the lid's center orifice and align the plunger's longitudinal centerline with that of the container. This lid also uses and o-ring around its edge to temporarily seal the lid's edge to the container's wall.

Figure 5:
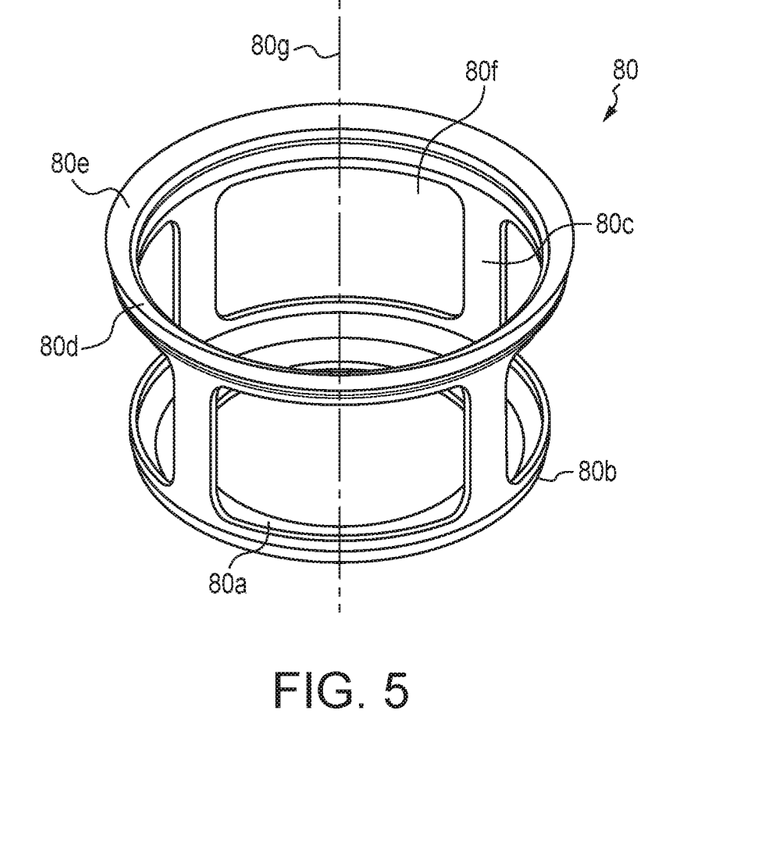
FIG. 5 is a perspective view of the pliable insert basket of the present invention shown in FIG. 1.

To aid in positioning and locating the cylindrical insert 20 in the bottom of the container, a pliable insert basket 80 is used to surround and protect the insert. See FIG. 5. It has an insert basket bottom 80a with a perimeter insert basket bottom edge 80b, and an insert basket side 80c that extends vertically upward from the insert basket's bottom edge for a specified uniform distance that defines the height of this side and terminates in an insert basket rim 80d that encloses and defines an insert basket opening 80f into the pliable insert basket. In general, it is configured to fit around the insert so that it may be more easily be temporarily and removably inserted into the container. The configuration and material of construction for this insert basket 80 (e.g., silicone) is such that placing the insert 20 into this insert basket helps to stiffen it so that the insert basket's rim assumes a position that is proximate the container's wall 10c. Furthermore, the insert basket's rim 80d has a top surface 80e that is configured to extend upward and outward from the insert basket's side 80c so as to provide a surface that directs the suspended infusible material down and into the insert 20 as the filtering basket 50 moves downward in the container 10.

The method of creating an acceptable or even an outstanding new version of a desired brew using the infusion process of the present invention involves the control of what are herein identified as certain brew parameters. These can include the following: (a) the particle size distribution of the ground beans, referred to herein as "grind," (b) the ratio of the amount of water to the amount of ground beans, referred to herein as "ratio," (c) the temperature of the water, (d) the amount of time the slurry (the mixture of the water and the ground infusible material or beans or grounds) is agitated or mixed, (e) the amount of time or the period that the slurry is allowed to steep, (f) the total filtration time, which is the time required to filter and separate the extract from the ground beans, and (g) the volume of the resulting extract as a percentage of the liquid initially added to the infusible material, which is a measure of how much compaction was applied to the resulting grounds in the insert.

After specific initial decisions have been made with respect to the brew parameters listed above, the steps involved in actually implementing the infusion method of the present invention can include: Pre-steps—Make sure all parts are clean and free of oils/sediments. Boil water for both brewing and preheating (recommended). Once the kettle boils, preheat the cylindrical container or carafe by adding some water. Grind your beans according to preference; medium-fine grind is recommended. Optional Step—Place optional paper filter in filtering basket or place other optional filter on top of or proximate the filtering basket's top surface for a third phase of filtering. Brewing Step 1—Place the ground beans or grounds in the insert or grounds container in the carafe and let the insert slide down to the bottom; it can be used as a measuring cup due to the premeasured lines which are inscribed on the inner face of the insert's side (alternatively, one can put the grounds container first in the carafe, then the grounds in after.) Step 2—Pour hot water (190-200 degrees) into the carafe and watch the ground beans move upward and be suspended in the hot water. There are premeasured, water/liquid lines on the container's wall to aid one in adding a specific desired amount of water. Step 3—Break the resulting crust of the water and suspended grounds mixture after one minute by back and forth stirs with a paddling motion using a non-metal spoon/stirrer. Step 4—Total Brewing Duration: Baseline recipe (adjust according to beans, roasts, and brew preference) for fine grind: 2.5 minutes; for medium grind: 3 minutes; for course grind: 4 minutes. Step 5—Press the plunger down very, very slowly until you cannot press any longer Pour your first cup, then press down a bit more to as firmly as possible compress the grounds into the insert and empty all of the remaining brew out of the container. Step 6—Once the liquid or brew has been drained out, lift the plunger and its attached filter basket back up along with the insert or grounds container which is temporarily adhered to the bottom of the filter basket. Empty the insert or grounds container and clean all parts and one's apparatus is ready for its next infusion and brewing task.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereafter set forth in the claims to the invention.

I claim:

1. An infusion process apparatus that allows a user to make and filter a beverage, yielded by an infusion process that steeps an infusible material which is temporarily suspended in a liquid for a specified steeping period of said infusible material, and then provides for the removal and disposal of said filtered infusible material, the apparatus comprising:
   a cylindrical container having a container bottom, a container wall with a container rim that encloses a container opening into said cylindrical container, and a container longitudinal centerline that extends between said container bottom and said container opening,
   a cylindrical insert having an insert bottom, an insert side that has a top portion which is bounded by an insert rim that extends around the entirety of said insert side so as to define an insert opening into said cylindrical insert, and wherein said cylindrical insert has a configuration adapted to enable said cylindrical insert to be inserted through said container opening and into said cylindrical container so that said insert bottom rests proximate said container bottom during said infusion process and said configuration further adapted to enable said cylindrical insert to initially contain a measured amount of said infusible material that is later temporarily suspended in said liquid during said infusion process,
   an elongated plunger having proximal and distal ends and a plunger longitudinal centerline that extends between said ends,
   a cylindrical container lid having a center orifice with a perimeter edge and a tubular wall having a configuration adapted to allow the distal end of said plunger to pass through said container lid center orifice so as to align said longitudinal centerline of said plunger with said container longitudinal centerline,
   a filtering basket having a solid basket bottom surface, a porous basket top surface, and a porous basket side that releaseably attaches to a surface chosen from the group including said basket bottom and top surfaces, and wherein said filtering basket top surface further has a configuration adapted to enable said basket top surface to attach to said plunger distal end so as to enable said filtering basket to be temporarily situated in said cylindrical container and moved up and down within said cylindrical container and insert by the upward and downward movement of said elongated plunger,
   a filter seal attached to said filtering basket top surface and which has a configuration that enables the sealing of said filtering basket to said container wall as said filtering basket moves downward in said container to filter said beverage by forcing said suspended infusible material downward and back into said cylindrical insert as said filtered beverage flows through said porous basket side and top surfaces and thereby undergoes, respectively, a first and a second filtration phase during said downward movement of said filtering basket, and
   a basket coupling means attached to said filtering basket and having a configuration adapted to enable said basket coupling means to temporarily and releaseably attach together with said cylindrical insert when said bottom surface of the filtering basket moves downward, to provide said filtration, and though said insert opening and into said insert so as to enable said insert, which is then filled with said filtered infusible material, to be lifted upward from the bottom of said container and eventually out of said container by the upward movement of said filtering basket.

2. The infusion process apparatus as recited in claim 1, wherein:
   said filtering basket bottom surface has a configuration adapted to compress and compact said filtered infusible material that has been forced down into said insert by the downward movement of said filtering basket and to temporarily and releaseably promote adhesion of said filtering basket bottom surface to said filtered and compacted infusible material and to stop the infusion process.

3. The infusion process apparatus as recited in claim 1, wherein:
   said insert bottom has a concave portion adapted to promote the movement of said insert off of the bottom of said container.

4. The infusion process apparatus as recited in claim 2, wherein:
   said insert bottom has a concave portion adapted to promote the movement of said insert off of the bottom of said container.

5. The infusion process apparatus as recited in claim 1, wherein:
   said insert rim has a top surface that is configured to extended upward and outward from said insert side so as to aid in directing the movement of the bottom surface of said filter basket though said insert opening and into said insert.

6. The infusion process apparatus as recited in claim 2, wherein:
   said insert rim has a top surface that is configured to extended upward and outward from said insert side so as to aid in directing the movement of the bottom surface of said filter basket though said insert opening and into said insert.

7. The infusion process apparatus as recited in claim 3, wherein:
   said insert rim has a top surface that is configured to extended upward and outward from said insert side so as to aid in directing the movement of the bottom surface of said filter basket though said insert opening and into said insert.

8. The infusion process apparatus as recited in claim 4, wherein:
   said insert rim has a top surface that is configured to extended upward and outward from said insert side so as to aid in directing the movement of the bottom surface of said filter basket though said insert opening and into said insert.

9. The infusion process apparatus as recited in claim 1, further comprising:
   a specialized filter, situated at a location chosen from the group consisting of within said filtering basket and proximate the top surface of said filtering basket, having a configuration adapted to provide said beverage with a third phase of filtration.

10. The infusion process apparatus as recited in claim 2, further comprising:
    a specialized filter, situated at a location chosen from the group consisting of within said filtering basket and proximate the top surface of said filtering basket, having a configuration adapted to provide said beverage with a third phase of filtration.

11. The infusion process apparatus as recited in claim 4, further comprising:
a specialized filter, situated at a location chosen from the group consisting of within said filtering basket and proximate the top surface of said filtering basket, having a configuration adapted to provide said beverage with a third phase of filtration.

12. The infusion process apparatus as recited in claim 6, further comprising:
a specialized filter, situated at a location chosen from the group consisting of within said filtering basket and proximate the top surface of said filtering basket, having a configuration adapted to provide said beverage with a third phase of filtration.

13. The infusion process apparatus as recited in claim 8, further comprising:
a specialized filter, situated at a location chosen from the group consisting of within said filtering basket and proximate the top surface of said filtering basket, having a configuration adapted to provide said beverage with a third phase of filtration.

14. The infusion process apparatus as recited in claim 9, further comprising:
a pliable insert basket having an insert basket bottom and an insert basket side with an insert basket rim that encloses an insert basket opening into said pliable insert basket, and wherein said pliable insert basket has a configuration adapted to enable said cylindrical insert to be temporarily and removably inserted into said insert basket so that said insert basket rim assumes a position that is proximate said container wall and aids in safely positioning and locating said cylindrical insert in the bottom of said cylindrical container without damaging said cylindrical container.

15. The infusion process apparatus as recited in claim 10, further comprising:
a pliable insert basket having an insert basket bottom and an insert basket side with an insert basket rim that encloses an insert basket opening into said pliable insert basket, and wherein said pliable insert basket has a configuration adapted to enable said cylindrical insert to be temporarily and removably inserted into said insert basket so that said insert basket rim assumes a position that is proximate said container wall and aids in safely positioning and locating said cylindrical insert in the bottom of said cylindrical container without damaging said cylindrical container.

16. The infusion process apparatus as recited in claim 11, further comprising:
a pliable insert basket having an insert basket bottom and an insert basket side with an insert basket rim that encloses an insert basket opening into said pliable insert basket, and wherein said pliable insert basket has a configuration adapted to enable said cylindrical insert to be temporarily and removably inserted into said insert basket so that said insert basket rim assumes a position that is proximate said container wall and aids in safely positioning and locating said cylindrical insert in the bottom of said cylindrical container without damaging said cylindrical container.

17. The infusion process apparatus as recited in claim 13, further comprising:
a pliable insert basket having an insert basket bottom and an insert basket side with an insert basket rim that encloses an insert basket opening into said pliable insert basket, and wherein said pliable insert basket has a configuration adapted to enable said cylindrical insert to be temporarily and removably inserted into said insert basket so that said insert basket rim assumes a position that is proximate said container wall and aids in safely positioning and locating said cylindrical insert in the bottom of said cylindrical container without damaging said cylindrical container.

18. The infusion process apparatus as recited in claim 15, wherein:
said insert basket rim has a top surface that is configured to extend upward and outward from said insert basket side so as to provide a surface that directs said filtered infusible material down and into said cylindrical insert as said filtering basket moves downward in said cylindrical container.

19. The infusion process apparatus as recited in claim 16, wherein:
said insert basket rim has a top surface that is configured to extend upward and outward from said insert basket side so as to provide a surface that directs said filtered infusible material down and into said cylindrical insert as said filtering basket moves downward in said cylindrical container.

20. The infusion process apparatus as recited in claim 17, wherein:
said insert basket rim has a top surface that is configured to extend upward and outward from said insert basket side so as to provide a surface that directs said filtered infusible material down and into said cylindrical insert as said filtering basket moves downward in said cylindrical container.

* * * * *